US009045144B2

(12) United States Patent
Schwindt et al.

(10) Patent No.: US 9,045,144 B2
(45) Date of Patent: Jun. 2, 2015

(54) THIRD-ORDER POLYNOMIAL-BASED COURSE PREDICTION FOR DRIVER ASSISTANCE FUNCTIONS (71) Applicant: Robert Bosch GmbH, Stuttgart (DE)

(72) Inventors: Oliver F. Schwindt, Novi, MI (US); Shilpa Gulati, Sunnyvale, CA (US); Bhavana Chakraborty, Sterling Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/169,958

(22) Filed: Jan. 31, 2014

(65) Prior Publication Data

US 2014/0336844 A1 Nov. 13, 2014

Related U.S. Application Data (60) Provisional application No. 61/821,482, filed on May 9, 2013.

(51) Int. Cl.
*G05D 1/00* (2006.01)
*B60W 50/00* (2006.01)
(Continued)

(52) U.S. Cl.
CPC .............. *B60W 50/0097* (2013.01); *G05D 1/00* (2013.01); *G01S 13/931* (2013.01); *G05D 1/0212* (2013.01); *B60K 31/0008* (2013.01); *B62D 15/025* (2013.01); *B60W 30/0953* (2013.01); *B60W 30/16* (2013.01);
(Continued)

(58) Field of Classification Search
CPC ........................................................ B62D 6/00
USPC ........... 701/1, 36, 41–44, 58, 70, 93–98, 301; 180/280; 340/435
See application file for complete search history.

(56) References Cited

U.S. PATENT DOCUMENTS 6,675,094 B2 * 1/2004 Russell et al. ................ 701/301
6,718,259 B1 4/2004 Khosla
(Continued)

FOREIGN PATENT DOCUMENTS

EP 1439442 7/2004
EP 1684142 7/2006
WO 2011131165 10/2011

OTHER PUBLICATIONS

Polychronopoulos et al., "Sensor Fusion for Predicting Vehicles' Path for Collision Avoidance" IEEE Transactions on Intelligent Transportation Systems, vol. 8, No. 3, Sep. 1, 2007, pp. 549-562.
(Continued)

*Primary Examiner* — Thomas Tarcza
*Assistant Examiner* — Tyler J Lee
(74) *Attorney, Agent, or Firm* — Michael Best & Friedrich LLP (57) ABSTRACT

Methods and systems for performing vehicle driver assistance. One method includes determining, at a controller, whether the vehicle is steering toward a drive-straight state and when the vehicle is steering toward the drive-straight state, calculating, at the controller, a predicted course trajectory using a third order polynomial. The method also includes calculating, at the controller, the predicted course trajectory using a non-third-order function when the vehicle is not steering toward the drive-straight state. In addition, the method includes performing the driver assistance based on the predicted course trajectory.

20 Claims, 8 Drawing Sheets (51) Int. Cl.
  *B60K 31/00* (2006.01)
  *B62D 15/02* (2006.01)
  *B60W 30/095* (2012.01)
  *B60W 30/16* (2012.01)
  *B60W 30/18* (2012.01)
  *G01S 13/93* (2006.01)
  *G05D 1/02* (2006.01)

(52) U.S. Cl.
  CPC .... *B60W 30/18163* (2013.01); *B60W 2520/14* (2013.01); *B60W 2540/18* (2013.01); *Y02T 10/84* (2013.01)

(56) References Cited

U.S. PATENT DOCUMENTS

| | | | |
|---|---|---|---|
| 7,620,497 B2 * | 11/2009 | Maass | 701/301 |
| 8,494,716 B1 * | 7/2013 | Lee et al. | 701/41 |
| 8,694,224 B2 * | 4/2014 | Chundrlik et al. | 701/84 |
| 2003/0225519 A1 | 12/2003 | Miyahara | |
| 2008/0270018 A1 | 10/2008 | Citelli | |
| 2013/0231830 A1 * | 9/2013 | Van Dan Elzen et al. | 701/42 |

OTHER PUBLICATIONS

International Search Report and Written Opinion for Application No. PCT/US2014/036974 dated Aug. 19, 2014 (13 pages).

* cited by examiner

THIRD-ORDER POLYNOMIAL-BASED COURSE PREDICTION FOR DRIVER ASSISTANCE FUNCTIONS

RELATED APPLICATIONS

The present application claims priority to U.S. Provisional Application No. 61/821,482 filed May 9, 2013, the entire content of which is hereby incorporated by reference.

FIELD

Embodiments of the present invention relate to methods and systems for predicting the travel course of a vehicle.

BACKGROUND

Vehicle systems, such as adaptive cruise control ("ACC") systems, can predict a course trajectory of a vehicle (also called a "current course prediction") and use the prediction to control the vehicle (e.g., automatically slow the vehicle).

SUMMARY

To generate a course prediction, vehicle systems can calculate a centerline of a predicted trajectory based on vehicle operating parameters and navigation information (e.g., GPS information). Using the centerline, the systems can generate a course prediction, which can be used to perform automatic vehicle control (e.g., ACC functionality, lane keeping support, lane departure warning, autonomous driving, etc.). Some existing vehicle systems use second order polynomial-based course prediction. However, second order polynomial-based course predictions can overestimate curves.

Accordingly, in one embodiment, the invention provides methods and systems for performing current course prediction using third-order polynomials. One method includes determining, at a controller, whether the vehicle is steering toward a drive-straight state, and, when the vehicle is steering toward the drive-straight state, calculating, at the controller, a predicted course trajectory using a third order polynomial. When the vehicle is not steering toward the drive-straight state, the method includes calculating, at the controller, the predicted course trajectory using a non-third-order function. Driver assistance is then performed based on the predicted course trajectory.

Another embodiment of the invention provides a driver assistance system for a vehicle. The system includes a vehicle dynamic state sensor and a controller. The controller is configured to receive a signal from the vehicle dynamic state sensor and determine when the vehicle will steer toward a drive-straight state based on the signal from the vehicle dynamic state sensor. The controller is also configured to calculate a predicted course trajectory using a third order polynomial when the vehicle is steering toward the drive-straight state and to calculate a predicted course trajectory using a non-third-order function when the vehicle is not steering toward the drive-straight state. The controller is further configured to perform a driver assistance function based on the predicted course trajectory.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

Figure 1:
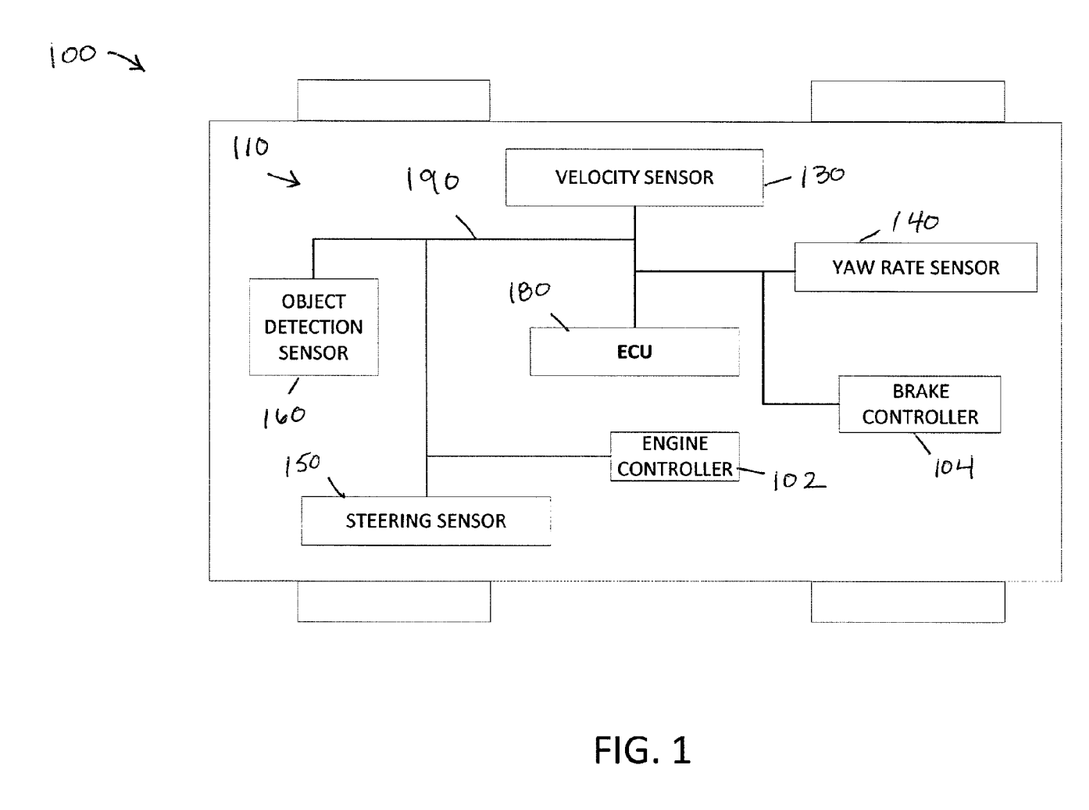
FIG. 1 schematically illustrates a vehicle including a driver assistance system.

FIG. 1 illustrates a vehicle 100 including an engine controller 102 and a brake controller 104. The vehicle 100 also includes a driver assistance system 110. The driver assistance system 110 includes a plurality of vehicle dynamic state sensors. The plurality of vehicle dynamic state sensors can sense current driving parameters, such as a steering angle of the vehicle 100, a steering angle velocity of the vehicle 100, a yaw rate of the vehicle 100, and a velocity of the vehicle 100. For example, the vehicle dynamic state sensors can include a velocity sensor 130, a yaw rate sensor 140, a steering angle sensor 150, and/or an object detection sensor 160. The velocity sensor 130 detects the velocity of the vehicle 100. The yaw rate sensor 140 detects the rate at which the vehicle 100 is turning about its yaw axis, and the steering sensor 150 detects changes in steering direction and/or velocity of the vehicle

100. The object detection sensor 160 detects objects in the vicinity of the vehicle 100 (e.g., other vehicles, sometimes referred to as target vehicles). The object sensor 160 can include one or more object-detecting sensors, such as one or more radar sensor and/or video sensors.

The driver assistance system 110 also includes an electronic control unit ("ECU") 180. In some embodiments, the ECU 180 communicates with the controllers 102 and 104 and the sensors 130, 140, 150, and 160 over a bus 190, such as a controller area network ("CAN"). Other connections between the components, whether wired, wireless, direct, or indirect, are also possible.

Figure 2:
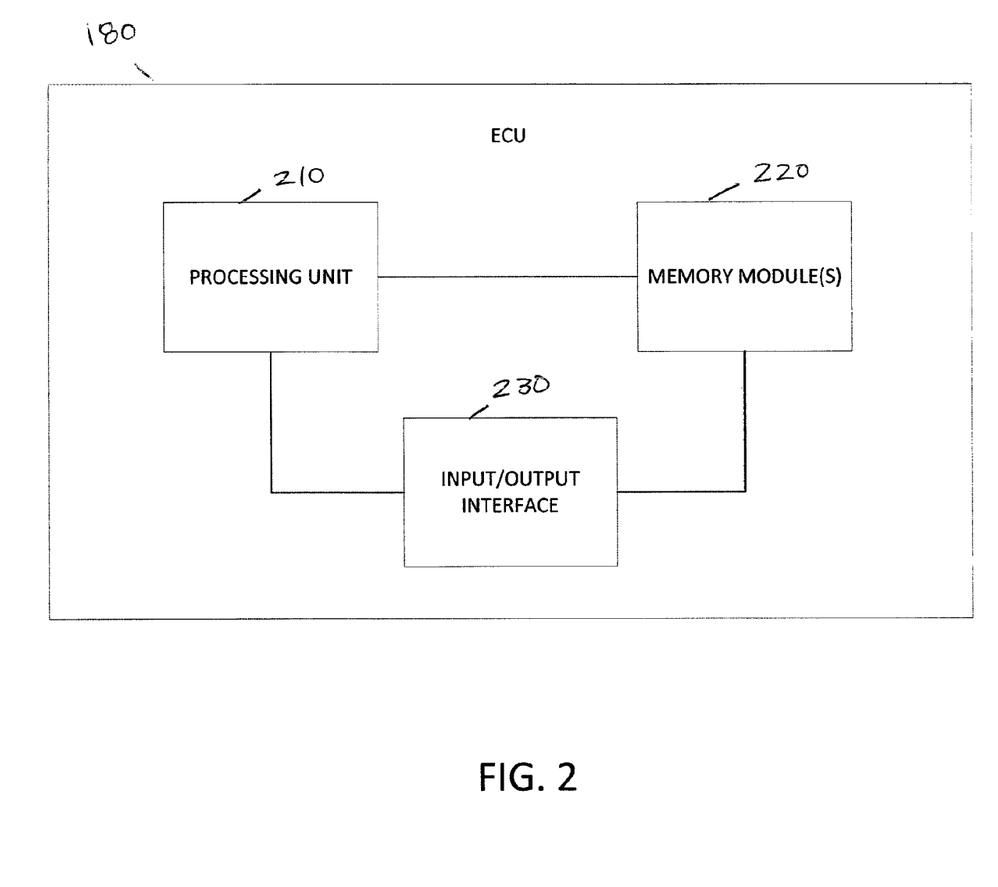
FIG. 2 schematically illustrates a control unit included in the driver assistance system of FIG. 1.

As illustrated in FIG. 2, the ECU 180 includes a processing unit 210 (e.g., a microprocessor, an application specific integrated circuit ("ASIC"), etc.), one or more memory modules 220, and an input/output interface 230. It should also be understood that the ECU 180 can include additional components other than those described herein. Furthermore, in some embodiments, the functionality of the ECU 180 (described below) can be distributed among multiple systems or devices. Also, in some embodiments, the functionality of the ECU 180 can be combined with other systems or devices.

The memory modules 220 include non-transitory computer-readable media, such as random-access memory ("RAM") and/or read-only memory ("ROM"). The processing unit 210 obtains data from devices and systems external to the ECU 180 through the input/output interface 230. For example, the ECU 180 receives input from the sensors 130, 140, 150, and 160 through the input/output interface 230. Similarly, the ECU 180 can be configured to provide output to the engine controller 102 and/or the brake controller 104 through the input/output interface 230.

The processing unit 210 receives information (e.g., from the memory modules 220 and/or the input/output interface 230) and processes the information by executing one or more instructions. The instructions are stored in the memory modules 220. The processing unit 210 also stores information (e.g., information received from the bus 190 or information generated by instructions executed by the processing 210) to the memory modules 220. The instructions stored in the memory modules 230 provide particular functionality when executed by the processing unit 210. In general, the instructions, when executed by the processing unit 210, use information from the sensors 130, 140, 150, and 160 to predict a vehicle trajectory and, in some embodiments, automatically control or assist the driver in controlling the vehicle 100 based on the predicted trajectory. For example, in some embodiments, the ECU 180 is configured to provide driver-assistance functionality, such as adaptive cruise control ("ACC"), parking assistance, etc., based on the predicted trajectory. In other embodiments, the ECU 180 is configured to output a predicted trajectory to one or more other controllers included in the vehicle 100 that provide driver assistance functionality.

Figure 3:
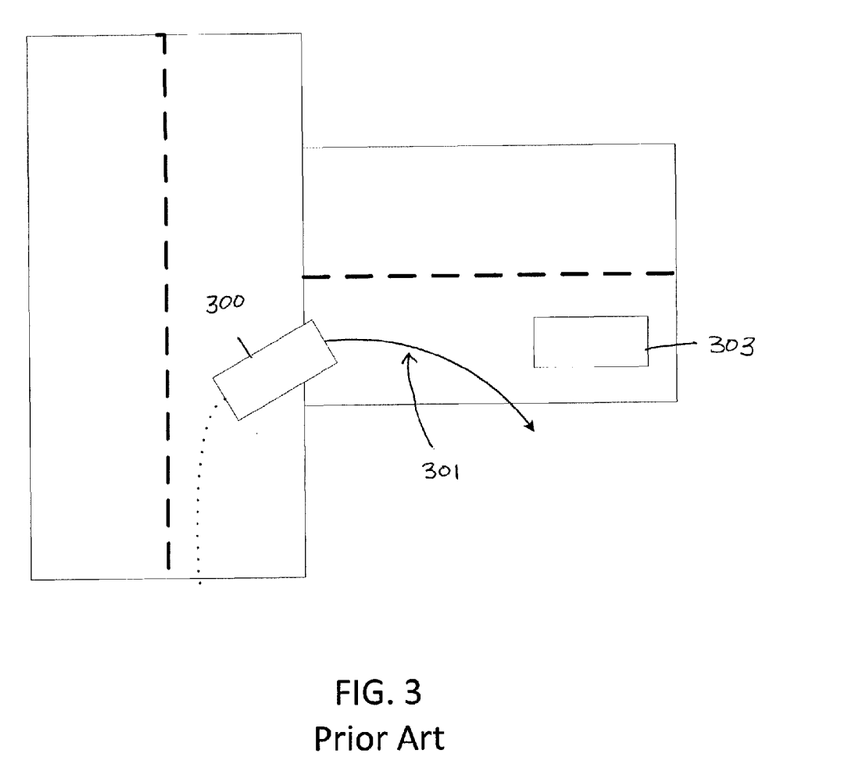
FIG. 3 diagrammatically illustrates course prediction for a turn scenario using second order polynomial-based course prediction.

As noted above, some existing vehicle systems perform second order polynomial-based course prediction. Performing course prediction using a second order polynomial, however, may not accurately model vehicle trajectory when a vehicle is exiting a curve. For example, to perform course prediction for the vehicle 300 using a second order polynomial, a centerline trajectory can be calculated using the following Equation (1) where kappa equals tan(phi)/L (phi is the steering angle of the vehicle and L is the distance between the front and rear axle of the vehicle), dx is distance in the longitudinal direction, and dy is distance in the lateral direction:

$$dy = (\tfrac{1}{2}) * kappa * dx * dx \quad (1)$$

The term kappa represents the curvature of the predicted vehicle trajectory and can also be represented as vehicle yaw rate (e.g., from the yaw rate sensor 140) divided by the vehicle's velocity (e.g., from the velocity sensor 130). The second-order model defined by Equation (1) is similar to the first term of a circle or the first term of a clothoid. A clothoid is a mathematical expression of lines with constant curvature change.

Figure 4:
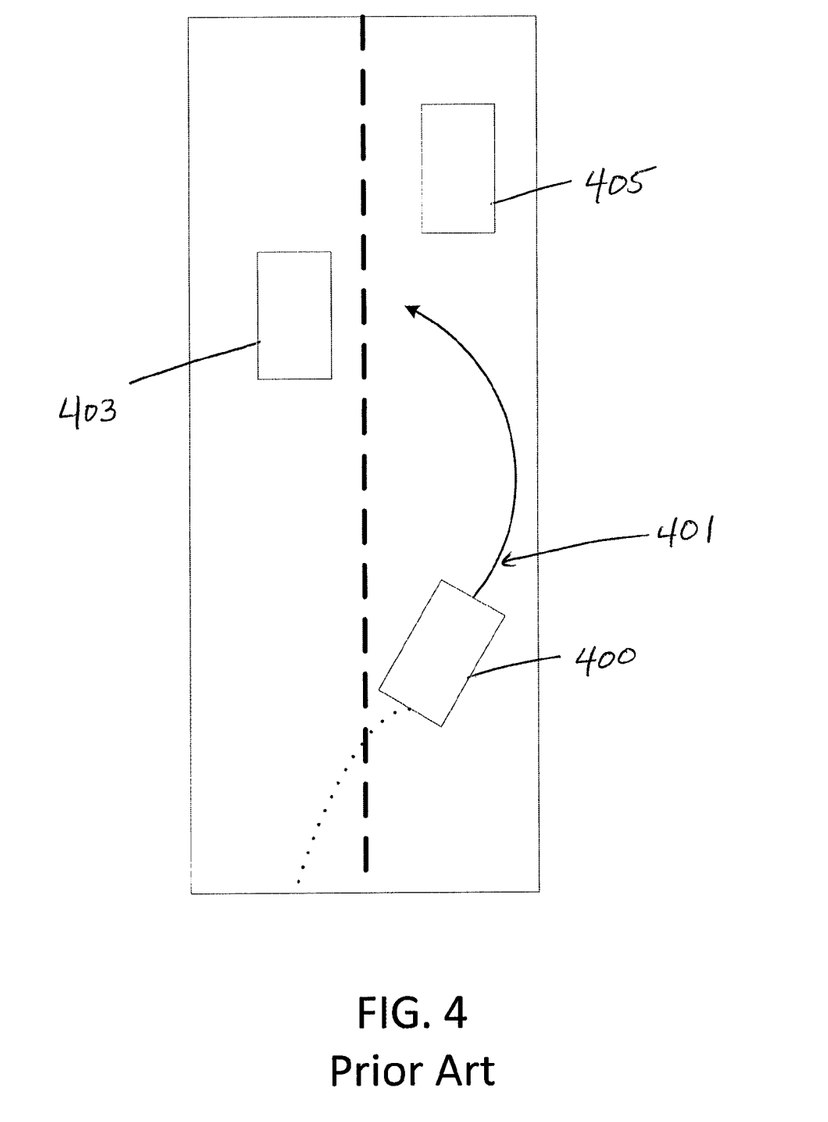
FIG. 4 diagrammatically illustrates course prediction for a lane change scenario using second order polynomial-based course prediction.

As illustrated in FIGS. 3 and 4, the second-order model overestimates the curvature of a turn. For example, FIG. 3 illustrates a vehicle 300 turning right. As the vehicle 300 turns right, the second order model defined by Equation (1) predicts a vehicle trajectory 301 that veers off the road and away from the vehicle 303. Accordingly, if the predicted trajectory 301 were used by an ACC system, the system may not properly detect that the vehicle 300 is approaching the vehicle 303.

Similarly, FIG. 4 illustrates a vehicle 400 in a lane change scenario. As the vehicle 400 steers away from the left lane and into the right lane, the second order model defined by Equation (1) predicts a vehicle trajectory 401 that curves toward the vehicle 403 in the left lane (e.g., according to a circular or clothoid-like trajectory). However, the vehicle's actual intended trajectory straightens into the right lane toward the vehicle 405. Therefore, an ACC system may incorrectly target the vehicle 403 as a potential lane disturbance rather than the vehicle 405, which may result in dangerous or uncomfortable vehicle control.

To overcome these and other problems with second order models, the ECU 180 uses third order models to predict at least a portion of a vehicle trajectory. Third order polynomials describe a spiral. Therefore, as a vehicle steers into a curve, a course trajectory calculated using a third order model would predict that the vehicle's steering wheel will be turned at the same rate indefinitely and, hence, the vehicle will never exit the curve. However, since curves in the road (including curves, turns, lane changes, etc.) do not always become stronger or continue indefinitely, the ECU 180 can be configured to use third order polynomial-based course trajectory when the vehicle 100 is exiting a curve.

For example, the ECU 180 can be configured to model a predicted vehicle trajectory either linearly (e.g., when the vehicle 100 is traveling straight) or by a second order polynomial (e.g., when the vehicle 100 is entering a curve) until the ECU 180 determines (e.g., based on driving parameters sensed by the vehicle dynamic state sensors) that the vehicle 100 is exiting a curve. Once this state has been determined, the ECU 180 uses third order polynomial-based course trajectory to straighten out the predicted vehicle course trajectory as the vehicle 100 steers out of the curve. After the vehicle 100 fully exits the curve (e.g., when the steering angle becomes zero for a straight line trajectory), the ECU 180 stops using the third order polynomial-based trajectory and returns to a non-third-order course prediction (e.g., second order course prediction). Accordingly, the ECU 180 can be configured to use a model for predicting a vehicle trajectory that includes a third order term and a non-third order term, where the third order term is only nonzero when the vehicle 100 is being steered out of a curve.

Figure 5:
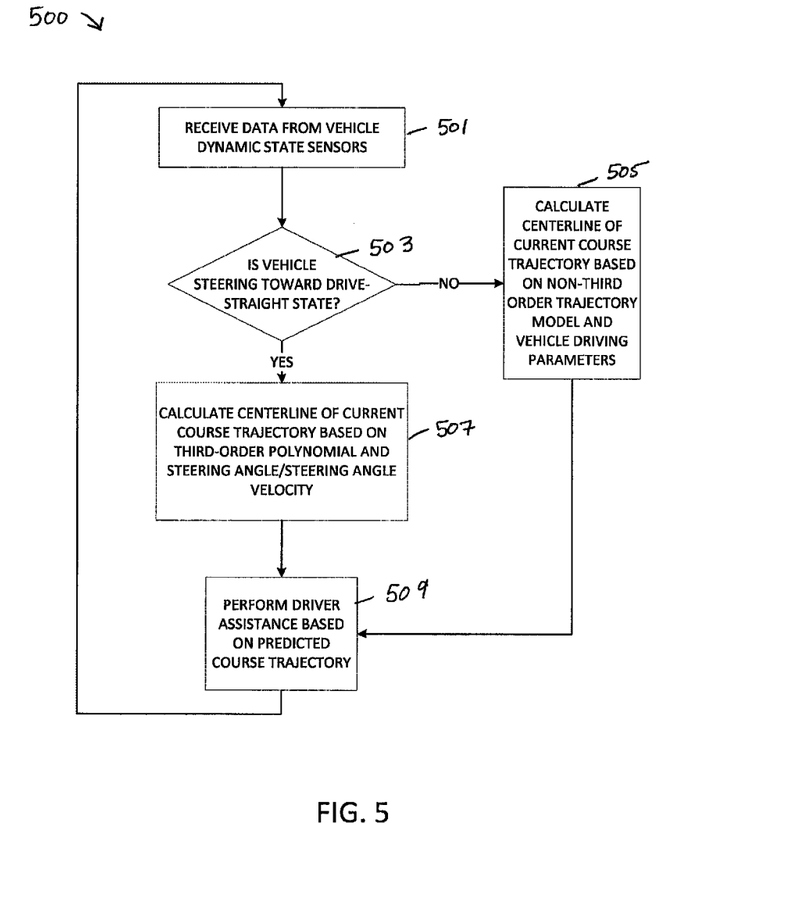
FIG. 5 is a flowchart illustrating control logic of the driver assistance system of FIG. 1.

For example, FIG. 5 illustrates a method 500 performed by the ECU 180 to predict vehicle trajectory. As illustrated in FIG. 5, the method 500 includes receiving, at the ECU 180, sensed driving parameters from the vehicle dynamic state sensors (at block 501). The sensed driving parameters can include a longitudinal velocity of the vehicle 100 as sensed by the velocity sensor 130, a vehicle yaw rate as sensed by the yaw rate sensor 140, a change in steering direction (e.g., a change in steering angle or steering angle velocity) as sensed by the steering sensor 150, and, optionally, one or more detected objects as sensed by the object detection sensor 160 (e.g., if the ECU 180 performs a driver assistance function that uses detected objects around the vehicle 100). The ECU 180 can store the sensed driving parameters (e.g., in the memory module 220).

The ECU 180 uses the driving parameters to determine whether the vehicle 100 is being steered toward a drive-straight state (at block 503). As noted above, third order polynomials can be used to accurately predict a vehicle trajectory when the vehicle is exiting a curve. Therefore, the ECU 180 can determine this state by detecting when the vehicle's steering wheel is steering the vehicle 100 toward an equilibrium or center point of the vehicle 100 (i.e., a drive-straight state).

For example, the ECU 180 can use the driving parameters sensed by the vehicle dynamic state sensors to determine if the magnitude of the steering angle is nonzero and decreasing, such that either (a) phi (the steering angle)>0 and phiDt (the steering angle velocity)<0, or (b) phi<0 and phiDt>0. In both cases (a) and (b), the steering angle is nonzero (i.e., the steering wheel has been displaced from the center point) but the steering angle velocity indicates that the steering wheel is returning toward the center point. In case (a), a positive steering angle (phi>0) may indicate that the steering wheel is currently displaced from the center point by a certain magnitude in the clockwise direction. Therefore, a negative steering angle velocity (phiDt<0) would indicate that the steering wheel is being turned counterclockwise (i.e., in the direction opposite the original displacement) and at a certain rate. Since the steering wheel angle indicates a clockwise displacement from the center point but is being turned counterclockwise, the steering wheel must be returning to the center point (i.e., the drive-straight state). The logic for case (b) is the same as that for case (a) with differences in directions for the steering angle and steering angle velocities.

When the vehicle 100 is not being steered toward a drive-straight state (at block 503), the ECU 180 calculates a non-third order polynomial-based course trajectory based on data from the vehicle dynamic state sensors (at block 505). The non-third order polynomial-based course trajectory can include a linear-based course prediction or a second order polynomial-based course trajectory (e.g., depending on the yaw rate or steering direction of the vehicle 100). For example, in some embodiments, the ECU 180 uses the second-order polynomial described above with respect to Equation (1) to predict a vehicle trajectory when the vehicle 100 is not being steered toward a drive-straight state, such as when the vehicle 100 is entering a curve.

However, when the vehicle 100 is being steered toward a drive-straight state (at block 503), the ECU 180 calculates a course trajectory using a third order polynomial-based model and data from the vehicle dynamic speed sensors (at block 507). For example, in one embodiment, the ECU 180 calculates a course trajectory (i.e., a centerline of a trajectory) based on the following third-order polynomial (Equation (2)), where kappa equals tan/(phi)/L, phi is the steering angle (e.g., the angle of the front wheels), L is the distance between the front and rear axles of the vehicle 100, b=phiDt/(L*v)*sec(phi)*sec(phi), phiDt is the steering angle velocity, and v is the vehicle velocity:

$$dy = (½)*kappa*dx*dx + (⅙)*b*dx*dx*dx \quad (2)$$

As noted above, the value for kappa represents the curvature of the predicted vehicle trajectory and can also be represented as vehicle yaw rate divided by vehicle velocity. In some embodiments, the steering angle (i.e., phi) is the angle (i.e., turn) of the front wheels. Also, in vehicles with a constant steering ratio, the steering angle can be attained by dividing the steering wheel angle by the steering ratio and the steering angle velocity can be determined by dividing the steering wheel angle velocity by the steering ratio. In some embodiments, the model defined by Equation (2) is rotated around the vehicle's 400 thrust angle, which is the angle between the direction the body of the vehicle is pointing and the direction in the vehicle moving. The thrust angle is sometimes referred to as the slip angle.

In some embodiments, the predicted course trajectory calculated using the third order polynomial-based model includes a first portion and a second portion. The ECU 180 calculates the first portion using the third order polynomial-based model and calculates the second portion using a non-third-order function. The first portion of the course trajectory extends from the vehicle 100 in a current driving direction of the vehicle (e.g., forward or backward). The second portion of the course trajectory extends from the end of the first portion (i.e., the distant end of the first portion opposite the end starting at the vehicle 100) in the current driving direction of the vehicle (e.g., forward or backward). In some embodiments, the ECU 180 calculates the second portion using a linear model.

The distance or length of the first portion is defined by a zero-curvature point. The zero-curvature point is the point at which the drive-straight state is predicted to occur that indicates the transition between the first portion and the second portion (i.e., the transition from a third order term and a non-third order term). For example, the zero-curvature point defines a distance along the predicted course trajectory where the trajectory should switch from a curved third-order representation to a non-third-order representation (e.g., a straight linear representation) based on data from the vehicle dynamic state sensors.

The ECU 180 is configured to calculate the zero-curvature point. The ECU 180 can calculate the zero-curvature point in a longitudinal direction based on a tangent of a steering angle of the vehicle divided by a distance between a front axle and a rear axle of the vehicle. The ECU 180 can also calculate the zero-curvature point in a longitudinal direction based on a yaw rate of the vehicle divided by a velocity of the vehicle.

For example, the position of the zero-curvature point along the predicted course trajectory can be determined based on the following Equation (3):

$$0 = kappa + b*dx \quad (3)$$

In particular, the zero-curvature point can be determined by taking the derivative of Equation (3) as illustrated in Equation (4):

$$dxZeroPoint = -kappa/b \quad (4)$$

In some embodiments, the ECU 180 calculates the second portion (i.e., the non-third order term) of the course trajectory based on the following Equation (5), where dyZeroPoint is the directional change in curvature in the lateral direction and firstDerivZeroPoint is the first derivative of the zero-curvature point (firstDerivZeroPoint=kappa*dxZeroPoint+(½)*b*dxZeroPoint*dxZeroPoint).

$$dy = dyZeroPoint + firstDerivZeroPoint*(dx - dxZeroPoint) \quad (5)$$

As noted previously, third order polynomials represent a spiral. Therefore, third order polynomials have an inflection point where the function changes sign (i.e., where the range values of the function change from positive to negative or vice versa). Accordingly, for a third order polynomial-based course trajectory, there is a change in sign in lateral distance beyond the zero-curvature point. In particular, when the vehicle 100 exits a curve, the third order polynomial-based course trajectory calculated by the ECU 180 anticipates that the vehicle 100 will immediately enter a new curve, despite the vehicle's intended trajectory. Therefore, the ECU 180 only uses the third order term of the course trajectory when the vehicle is steering toward the drive-straight state (i.e., the first portion of the trajectory). Thus, the third order term is zero for distances represented beyond the calculated zero-curvature point (i.e., the second portion of the trajectory).

As illustrated in Equations (3) and (4), the zero-curvature point can be impacted by steering angle velocity. Accordingly, the zero-curvature point has a greater impact on course prediction when the steering angle velocity gets larger. In particular, the zero-curvature point is calculated as occurring further ahead of the vehicle for small steering angle velocities, such that the curvature directional change indicated by the zero-curvature point may not be within the field of view of the object detection sensor 160 (e.g., a radar sensor). Accordingly, a course prediction within the field of view likely follows the third-order model. However, for large steering angle velocities, the zero-curvature point is calculated nearer the vehicle, and, therefore, would more likely be within the field of view of the object detection sensor 160. Therefore, in these situations, the location of the zero-curvature point along the predicted course trajectory can be used to more accurately predict the vehicle's course within the view of the object detection sensor 160. This results in more accurate identification of objects (e.g., other vehicles) that may collide with the vehicle's predicted trajectory.

In addition to or as an alternative to calculating a zero-curvature point, the ECU 180 can be configured to use other information about the curvature of the road to determine the length of the first portion of the predicted course trajectory (i.e., the third order term). For example, if a navigation system (e.g., a GPS system) supplies information regarding the curvature of an oncoming stretch of road, the contribution of the third order term can be zeroed (i.e., the first portion of the trajectory can end) when the curve in the road is reached. By using this additional information regarding a road's curvature, the ECU 180 can better detect lane changes or curves.

As also illustrated above, vehicle velocity is in the denominator of the variable b (see Equation (4)). Therefore, for small velocities close to zero (or approximately zero), variable b becomes undefined and unstable. Accordingly, the ECU 180 can be configured to use a non-third-order model (e.g., a second-order current course prediction) when the vehicle 100 is determined to be steering toward the drive-straight state at low velocities (e.g., for vehicle velocities less than approximately 1.0 meters per second).

After the ECU 180 calculates a course trajectory, the ECU 180 can use the trajectory to perform driver assistance (at block 509). In particular, as noted above, the ECU 180 can be configured to perform ACC functionality or other driver assistance functionality. In other embodiments, the ECU 180 can transmit a calculated course trajectory (e.g., through the input/output interface 230) to a separate system or controller that performs driver assistance functionality. When the ECU 180 (or a separate controller) performs ACC functionality, the ECU 180 can be configured to use the predicted course trajectory to determine whether another vehicle is located in the vehicle's trajectory. If so, the ECU 180 can be configured to automatically adjust the vehicle's speed, such as by communicating with the vehicle's engine controller 102 and/or a brake controller 104 (e.g., to slow down the vehicle 100 when the vehicle 100 gets too close to another vehicle or object).

As illustrated in FIG. 5, in some embodiments, the ECU 180 repeatedly (e.g., continuously) calculates a new course trajectory based on updated driving parameters from the vehicle dynamic state sensors (at block 501). Also, in some embodiments, the ECU 180 calculates the zero-curvature point as part of calculating the predicted course trajectory (a block 507). Therefore, as the predicted course trajectory is updated, the zero-curvature point is also updated.

Figure 6:
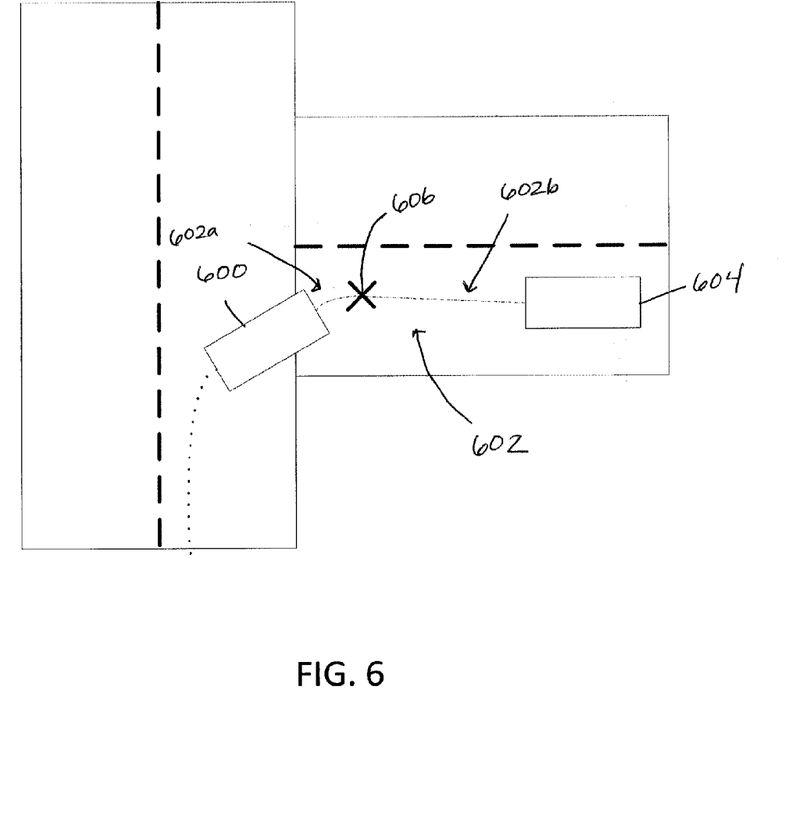
FIG. 6 diagrammatically illustrates centerline course prediction for a turn scenario using the control logic of FIG. 5.
Figure 7:
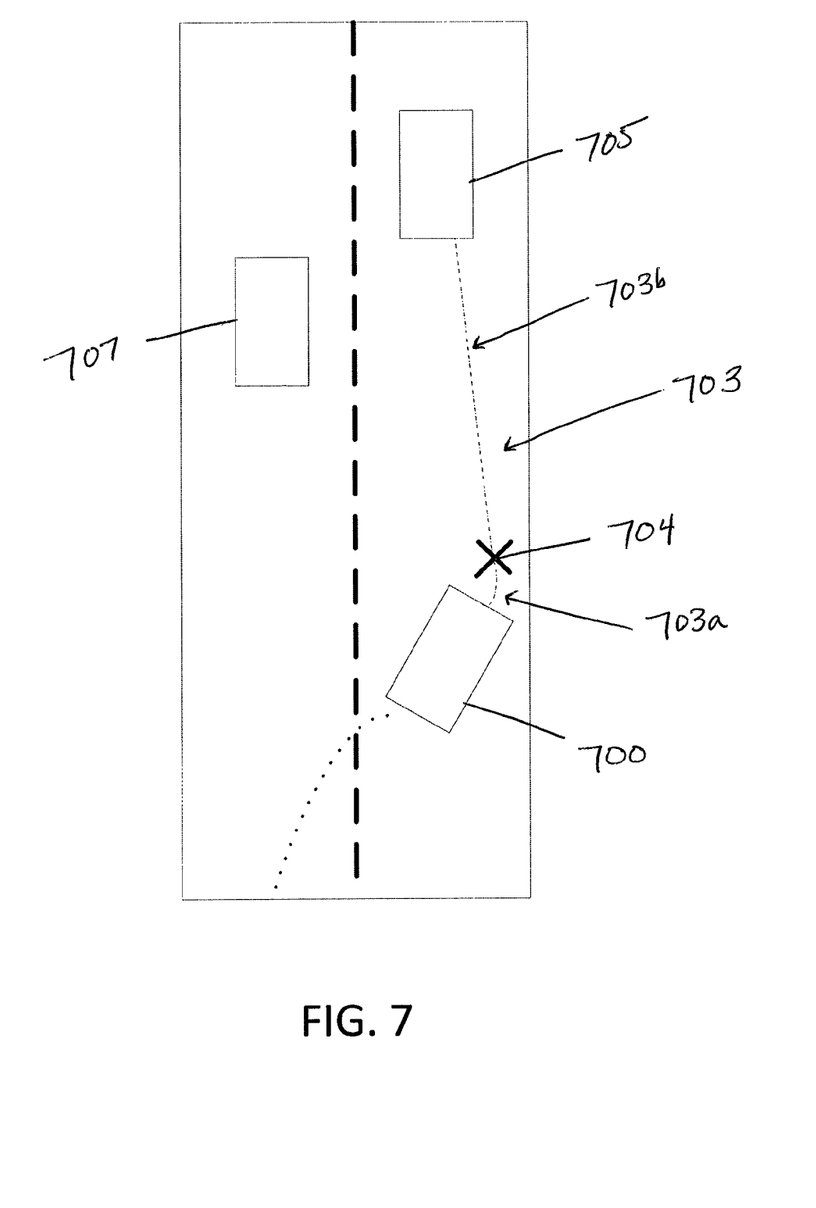
FIG. 7 diagrammatically illustrates centerline course prediction for a lane change scenario using the control logic of FIG. 5.

FIGS. 6 and 7 illustrate course prediction performed by the ECU 180. As illustrated in FIG. 6, as a vehicle 600 begins to straighten out after performing a right turn, the ECU 180 generates a predicted vehicle trajectory 602 using a third order polynomial that straightens out the predicted vehicle trajectory. Accordingly, the course trajectory 602 points toward the vehicle 604 as opposed to pointing off the road (see FIG. 3). As illustrated in FIG. 6, the course trajectory 602 includes a first portion 602a and a second portion 602b. The first portion 602a is calculated using a third order polynomial and extends from the vehicle 600 in the direction of travel of the vehicle 600 (i.e., forward). The first portion 602a ends at the zero-curvature point 606. The second portion 602b of the trajectory is calculated using a non-third-order function (e.g., a linear model) and extends from the zero-curvature point 606 in the direction of travel of the vehicle 600 (i.e., forward). Based on the predicted vehicle trajectory 602, the vehicle 600 can perform ACC functionality or other driver assistance functions (e.g., with the ECU 180 or a separate controller). For example, when performing ACC functionality, the predicted vehicle trajectory 602 is used to identify the vehicle 606 as a preceding or target vehicle and automatically control the speed of the vehicle 600 to maintain a predetermined distance between the vehicle 600 and the vehicle 603.

Similarly, as illustrated in FIG. 7, as a vehicle 700 begins to straighten out into the right lane after performing a lane change, the ECU 180 generates a predicted vehicle trajectory 703 using a third order polynomial that straightens out the predicted vehicle trajectory. Again, the predicted vehicle trajectory 703 includes a first portion 703a and a second portion 703b. The first portion 703a is calculated using a third order polynomial (i.e., the third order term is nonzero) and extends from the vehicle 700 in the direction of travel of the vehicle 700 (i.e., forward). The first portion 703a ends at the zero-curvature point 704. The second portion 703b of the trajectory is calculated using a non-third-order function (e.g., a linear model where the third order term is zero) and extends from the zero-curvature point 704 in the direction of travel of the vehicle 700 (i.e., forward). Accordingly, the predicted vehicle trajectory 703 points toward the vehicle 705 in the new lane of the vehicle 700 as opposed to pointing toward the vehicle 707 in the neighboring lane (see FIG. 4). Therefore, if the predicted vehicle trajectory 703 is used to perform ACC functionality, the vehicle 705 can be identified as a preceding vehicle and the speed of the vehicle 700 can be automatically controlled to maintain a predetermined distance between the vehicle 700 and the vehicle 705.

It should be understood that the centerline trajectory described above can be converted into a two-dimensional vehicle trajectory based on a known width of the vehicle 100. In other embodiments, separate borders (i.e., a right and left border) can be defined in addition to or as an alternative to a centerline trajectory. For example, in some embodiments, the third order polynomial-based course trajectory is stabilized against noise in the steering angle velocity, such as to avoid target object losses in object detection or ACC applications. Noise in the steering angle velocity can be caused by varying the steering velocity while exiting a curve (e.g., the driver does not steer with constant velocity in a curve exit). For example, where the third order term is nonzero, the left and right borders of the predicted vehicle trajectory can be modeled unequally. In particular, during a right turn the left border can be modeled based on a third order polynomial and the right border can be modeled based on a mix of both second and third order polynomials. An exemplary ratio of a third order to second order polynomial mix could be 80% to 20%. For a left turn, the left border is modeled using the polynomial mix and the right border is modeled using a pure third-order polynomial.

Figure 8:
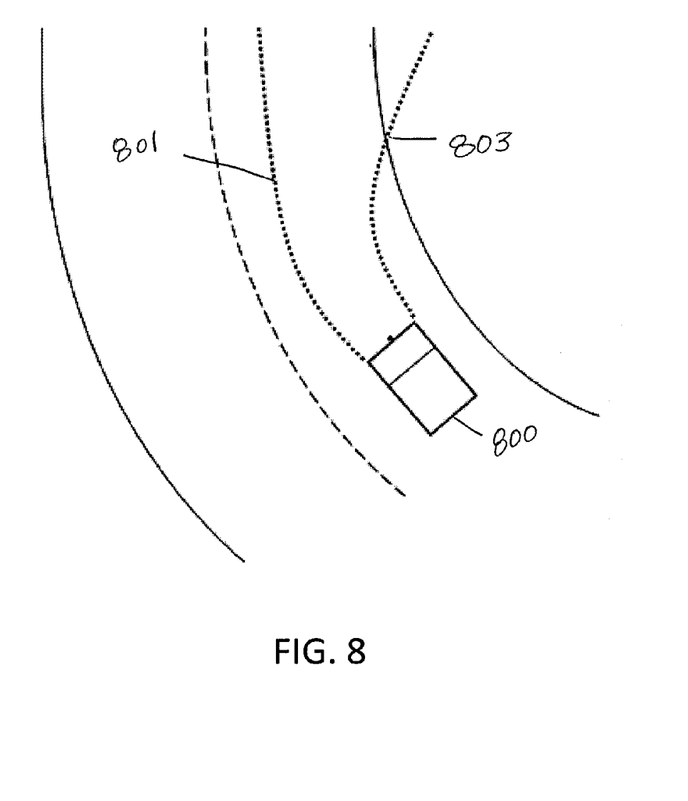
FIG. 8 diagrammatically illustrates border course prediction.

For example, FIG. 8 illustrates a vehicle 800 exiting a curve. As the vehicle 800 begins to steer toward the drive-straight state, the ECU 180 generates a third order polynomial-based left border 801 and a mixed polynomial-based right border 803. The right border 803 "widens" the predicted vehicle trajectory due to the presence of the second order polynomial component, which increases the curvature of the right border 803. Widening the predicted vehicle trajectory in this way safeguards the predicted vehicle trajectory against varying steering angle velocities, which may cause an unstable predicted vehicle trajectory. In particular, since the third order polynomial-based course trajectory is recalculated for each change in steering angle velocity, a varying steering angle velocity may cause a wavering (i.e., noisy) predicted vehicle trajectory. By implementing a widened predicted vehicle trajectory, noise can be reduced or eliminated by encompassing the varying steering angle velocity as a range as opposed to a wavering trajectory. For example, if the steering angle velocity is determined to be non-constant, one of the borders (e.g., the border on the side corresponding to the direction of the curve) can be calculated based on the polynomial mix.

Thus, embodiments of the invention relate to systems and methods for predicting the trajectory of a vehicle. As noted above, the third order polynomial-based course predictions can be used by ACC systems or other systems providing automatic driver assistance. Also, the course prediction methodology described above defines a trajectory based on a centerline and a fixed width. However, it should be understood that other methods can be used to predict the width of a vehicle trajectory (e.g., variable width (e.g., based on detected distances), detected lane widths, etc.). Furthermore, different shapes for the predicted vehicle trajectory, including the predicted boundaries, may also be used. In addition, it should be understood that the thresholds, values, and parameters described herein are provided as examples and can vary based on vehicle operation, vehicle size, driving environment, driver assistance functionality, etc.

Various features of the invention are set forth in the following claims.

What is claimed is:

1. A method of performing driver assistance for a vehicle, the method comprising:
   receiving a state signal from at least one dynamic state sensor,
   determining, at a controller, whether the vehicle is steering toward a drive-straight state, based on the state signal;
   calculating, at the controller, a predicted course trajectory using a third order polynomial in response to a determination that the vehicle is steering toward the drive-straight state;
   calculating, at the controller, the predicted course trajectory using a non-third-order function in response to a determination that the vehicle is not steering toward the drive-straight state; and
   performing the driver assistance based on the predicted course trajectory.

2. The method of claim 1, wherein determining whether the vehicle is driving toward the drive-straight state includes determining whether a steering angle of the vehicle is greater than zero and a steering angle velocity of the vehicle is less than zero.

3. The method of claim 1, wherein determining whether the vehicle is driving toward the drive-straight state includes determining whether a steering angle of the vehicle is less than zero and a steering angle velocity of the vehicle is greater than zero.

4. The method of claim 1, wherein calculating the predicted course trajectory using a third order polynomial includes calculating a first portion of the predicted course trajectory using the third order polynomial, the first portion extending from the vehicle in a driving direction of the vehicle, and calculating a second portion of the predicted course trajectory using a non-third-order function, the second portion extending from an end of the first portion in the driving direction of the vehicle.

5. The method of claim 4, wherein calculating the first portion of the predicted course trajectory includes determining a distance along the first portion where the vehicle reaches a zero-curvature point, the zero-curvature point defining the end of the first portion.

6. The method of claim 5, wherein determining the distance includes calculating the zero-curvature point in a longitudinal direction based on a tangent of a steering angle of the vehicle divided by a distance between a front axle and a rear axle of the vehicle.

7. The method of claim 4, wherein determining the distance includes calculating the zero-curvature point in a longitudinal direction based on a yaw rate of the vehicle divided by a velocity of the vehicle.

8. The method of claim 4, wherein calculating the second portion of the predicted course trajectory includes calculating the second portion using a linear model.

9. The method of claim 1, further comprising, when a velocity of the vehicle is less than approximately 1.0 meters per second, calculating the predicted course trajectory using a non-third-order function.

10. The method of claim 1, wherein calculating the predicted course trajectory using the third order polynomial includes combining the predicted course trajectory calculated using the third order polynomial and the predicted course trajectory calculated using the non-third-order function.

11. A driver assistance system for a vehicle, the system including:
   a vehicle dynamic state sensor; and
   a controller configured to:
      receive a signal from the vehicle dynamic state sensor,
      determine whether the vehicle is steering toward a drive-straight state based on the signal from the vehicle dynamic state sensor,
      calculate a predicted course trajectory using a third order polynomial in response to a determination that the vehicle is steering toward the drive-straight state,
      calculate the predicted course trajectory using a non-third-order function in response to a determination that the vehicle is not steering toward the drive-straight state, and
      perform a driver assistance function based on the predicted course trajectory.

12. The system of claim 11, wherein the signal indicates at least one selected from the group comprising (i) a steering angle of the vehicle, (ii) a steering angle velocity of the vehicle, (iii) a yaw rate of the vehicle, and (iv) a velocity of the vehicle.

13. The system of claim 11, wherein the controller determines whether the vehicle is driving toward the drive-straight state based on whether a steering angle of the vehicle is less than zero and a steering angle velocity of the vehicle is greater than zero.

14. The system of claim 11, wherein the controller is configured to calculate the predicted course trajectory using the third order polynomial by calculating a first portion of the predicted course trajectory using the third order polynomial, the first portion extending from the vehicle in a driving direction of the vehicle, and calculating a second portion of the predicted course trajectory using a non-third-order function, the second portion extending from an end of the first portion in the driving direction of the vehicle.

15. The system of claim 14, wherein the controller is configured to determine a distance along the first portion where the vehicle reaches a zero-curvature point, the zero-curvature point defining the end of the first portion.

16. The system of claim 15, wherein the controller is configured to calculate the zero-curvature point in a longitudinal direction based on a tangent of a steering angle of the vehicle divided by a distance between a front axle and a rear axle of the vehicle.

17. The system of claim 15, wherein the controller is configured to calculate the zero-curvature point in a longitudinal direction based on a yaw rate of the vehicle divided by a velocity of the vehicle.

18. The system of claim 14, wherein the controller is configured to calculate the second portion of the predicted course trajectory using a linear model.

19. The system of claim 11, wherein the controller calculates the predicted course trajectory based on combining a predicted course trajectory using the third order polynomial and the predicted course trajectory using the non-third-order function.

20. The system of claim 11, wherein the controller determines whether the vehicle is driving toward the drive-straight state based on whether a steering angle of the vehicle is greater than zero and a steering angle velocity of the vehicle is less than zero.

* * * * *